United States Patent [19]
Na

[11] Patent Number: 5,670,219
[45] Date of Patent: Sep. 23, 1997

[54] GREETING CARD AND ORNAMENT

[76] Inventor: Hong C. Na, 1313 Dolly Madison Blvd., McLean, Va. 22101

[21] Appl. No.: 509,135

[22] Filed: Jul. 31, 1995

Related U.S. Application Data

[63] Continuation-in-part of Ser. No. 299,619, Sep. 2, 1994, abandoned.

[51] Int. Cl.$^6$ .............................. B44C 3/00; B60R 13/00
[52] U.S. Cl. .................. 428/8; 428/28; 428/31; 428/133; 428/905
[58] Field of Search .................. 428/7, 8, 28, 53, 428/133, 905, 31

[56] References Cited

U.S. PATENT DOCUMENTS

| | | | |
|---|---|---|---|
| D. 164,326 | 8/1951 | Robins | D19/2 |
| D. 253,776 | 12/1979 | Molemaar | D21/93 |
| D. 277,742 | 2/1985 | Hermanson | 428/11 X |
| D. 331,785 | 12/1992 | Mast | D21/93 |
| 560,899 | 5/1896 | Frazee | 428/8 X |
| 2,616,199 | 11/1952 | Robins | 428/9 |
| 3,411,228 | 11/1968 | Lacey | 428/8 X |
| 3,945,568 | 3/1976 | Bychowski | 428/11 X |
| 4,055,690 | 10/1977 | Patterson | 428/9 |
| 4,084,015 | 4/1978 | Patterson | 428/9 |
| 4,192,903 | 3/1980 | Tremblay | 428/8 |
| 4,419,395 | 12/1983 | Sugimoto | 428/28 |
| 4,476,171 | 10/1984 | Takeuchi | 428/38 |
| 5,092,809 | 3/1992 | Kessler | 446/217 |
| 5,148,769 | 9/1992 | Zelinger | 119/708 |

*Primary Examiner*—Henry F. Epstein
*Attorney, Agent, or Firm*—Richard C. Litman

[57] ABSTRACT

A greeting card including an ornament, uniquely suited for display in an automobile. The card includes a pocket for containment of an ornament. The ornament has a reflective, preferably colored exterior, and an elastic tether. Thus, the ornament is caused to oscillate vertically in response to vehicle motion. The ornament is preferably formed from intersecting sheets of material having a glittering surface, which construction induces rotating and swinging motion of the ornament responsive to air currents within the vehicle, in addition to the bobbing or oscillations caused by vehicle motion. These complex motions, combined with the colored and glittering appearance, maximize the twinkling visual effect of this uncomplicated device while requiring no effort on the part of the observer or user. In a preferred embodiment, the ornament is impregnated with a pine scent in order to further thematically link the ornament to Christmas. The ornament is secured to a glass window in alternative embodiments by either an adhesive coated sheet or a suction cup attached to the tether, and thus is easily attached and removed.

10 Claims, 3 Drawing Sheets

GREETING CARD AND ORNAMENT

CROSS-REFERENCE TO RELATED APPLICATION

This application is a continuation-in-part of application Ser. No. 08/299,619 filed Sep. 2, 1994, now abandoned.

BACKGROUND OF THE INVENTION

1. Field of the Invention

The present invention relates to a greeting card including a reflective decoration having self-induced motion. The decoration is designed to be advantageously suspended in an automobile, the motion of the vehicle inducing attention attracting motion of the decoration.

2. Description of the Prior Art

Suspended ornaments have long been employed to adorn Christmas trees. Such ornaments are typically reflective and brightly colored. Due to the close association of this class of ornament with Christmas trees, the prior art has accentuated the link between trees and ornaments by providing the ornament with a source of appropriate scent. U.S. Pat. No. Des. 277,742, issued to Merril Hermanson on Feb. 26, 1985, and U.S. Pat. No. 3,945,568, issued to William E. Bychowski on Mar. 23, 1976, exemplify this feature.

Christmas ornaments are frequently provided with spangles or reflective facets, so that a visual impression of twinkling is achieved. This characteristic is more pronounced when the ornament is moved, as by ambient air currents.

Exploiting air currents to induce motion is employed in a second type of object, which is employed both as a toy and occasionally for ornamentation. This object is the well known pinwheel. Typical prior art pinwheels are shown in U.S. Pat. No. Des 253,776, issued to Lester V. Molenaar on Dec. 25, 1979, U.S. Pat. No. Des. 331,785, issued to Richard Mast on Dec. 15, 1992, and U.S. Pat. No. 5,092,809, issued to Brian D. Kessler on Mar. 3, 1992.

A toy for pets attached to an environmental surface is seen in U.S. Pat. No. 5,148,769, issued to Alan Zelinger on Sep. 22, 1992. The toy has an object suspended upon a length of spring metal rod anchored at a suction cup. The toy is intended to be batted about by an animal for amusement, and visual aspects of the batted object are not critical to the purpose.

German Pat. Application No. 29 49 901, dated Jun. 19, 1981, discloses a brooch or the like which is sewn to a garment. The brooch is luminescent or reflective.

Prior patents disclosing greeting cards which include ornaments include: U.S. Pat. No. 2,616,199, issued to Seymour Robins on Nov. 4, 1952; U.S. Pat. No. 3,411,228 issued to John W. Lacey on Nov. 19, 1968; U.S. Pat. No. 4,055,690 issued to Micheal P. Patterson on Oct. 25, 1977; and U.S. Pat. No. 4,084,015, issued to Micheal P. Patterson on Apr. 11, 1978. The ornaments in these cards all require some form of assembly.

The foregoing patents and inventions disclose individual features found in the present invention. However, none of the above inventions and patents, taken either singly or in combination, is seen to describe the instant invention as claimed.

SUMMARY OF THE INVENTION

The present invention provides a greeting card including an ornament. This novel card allows the card sender to provide a convenient object for the recipient to display, thus providing for the long term remembrance of the sender. The card provides all the functions of a conventional greeting card, such as delivering an appropriate message from the sender to the recipient. However, upon receipt of the card the ornament may be displayed. The card therefore provides a impression which endures much longer than if the card were simply stored away.

The ornament contained in the card is uniquely suited for decorating a motor vehicle. In this environment, two significant aspects differ from the more typical Christmas tree ornaments. One is that an automobile or other motor vehicle is not the stationary environment provided within a building. Motor vehicles accelerate, decelerate, turn, and negotiate bumps and like obstructions in the road, all of which combine to impart a constantly changing variety of motions to the vehicle. The present invention employs an uncomplicated elastic tether to cooperate with and exploit these motions by passing them on to the ornament. The glittering nature of the ornament, when subjected to these motions, produces a twinkling effect to the beholder.

Vertical suspension of the ornament from the vehicle on an elastic tether also produces a vertical, bobbing motion. When combined with air currents within the vehicle, which tend to cause the ornament to rotate about a vertical axis aligned with the tether, the visual effect is maximized.

Certain structural characteristics are employed to create the intended effect. The ornament has external surfaces provided with suitably reflective surfaces. Also, the body of the ornament is formed from sheet material, arranged to intersect in the manner of paddles. This structure minimizes weight, to avoid disruption of activities should the ornament break free from its attachment, and also causes the body to catch air currents and to move responsively thereto. The tether further allows the ornament to swing in response to vehicle motion, air currents, or both.

In a second departure from the usual environment of a Christmas ornament, suitable environmental structure for attaching the pendant ornament to the vehicle is generally not available. Since visual appeal is the principal focus of interest of ornaments, it is desirable to locate the ornament such that visibility is maximized. However, it is also desirable not to interfere with the driver and passengers who may be present in the vehicle.

A preferred location within many passenger sedans, therefore, is above the deck at the rear window. Attachment to fabric or like surfaces, such as the vehicle headliner, can usually be accomplished only by penetrating the headliner, and thus risking damage to the same. A convenient point of attachment, therefore, is the smooth surface of the rear window.

Several forms of a suitable attachment device are possible. A section of stiff cardboard or the like, coated with an adhesive enables facile, convenient attachment of the ornament to a window, and removal therefrom. A suction cup may also be employed in place of the adhesive coated board. The adhesive coated board is preferred, for reasons of economy of cost, and to enable flat packaging.

The novel ornament is further thematically linked to Christmas by incorporation of a volatile, scented substance, for emitting a selected aroma, such as that of pine.

The combined effects thus produce considerable sensory stimulation from an uncomplicated, inexpensive apparatus.

Accordingly, it is a principal object of the invention to provide a greeting card including a pendant ornament suitable for use in a motor vehicle.

It is another object of the invention to cause the pendant ornament to cooperate with the motion of a motor vehicle to enhance and maximize visual effects.

It is a further object of the invention to enable the pendant ornament to move vertically or bob when the vehicle is driven.

Still another object of the invention is to cause the pendant ornament to rotate in response to air currents.

An additional object of the invention is to cause the pendant ornament to twinkle when the vehicle is driven.

It is again an object of the invention to minimize weight and complexity of the ornament.

A still further object of the invention is to emit an aroma.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
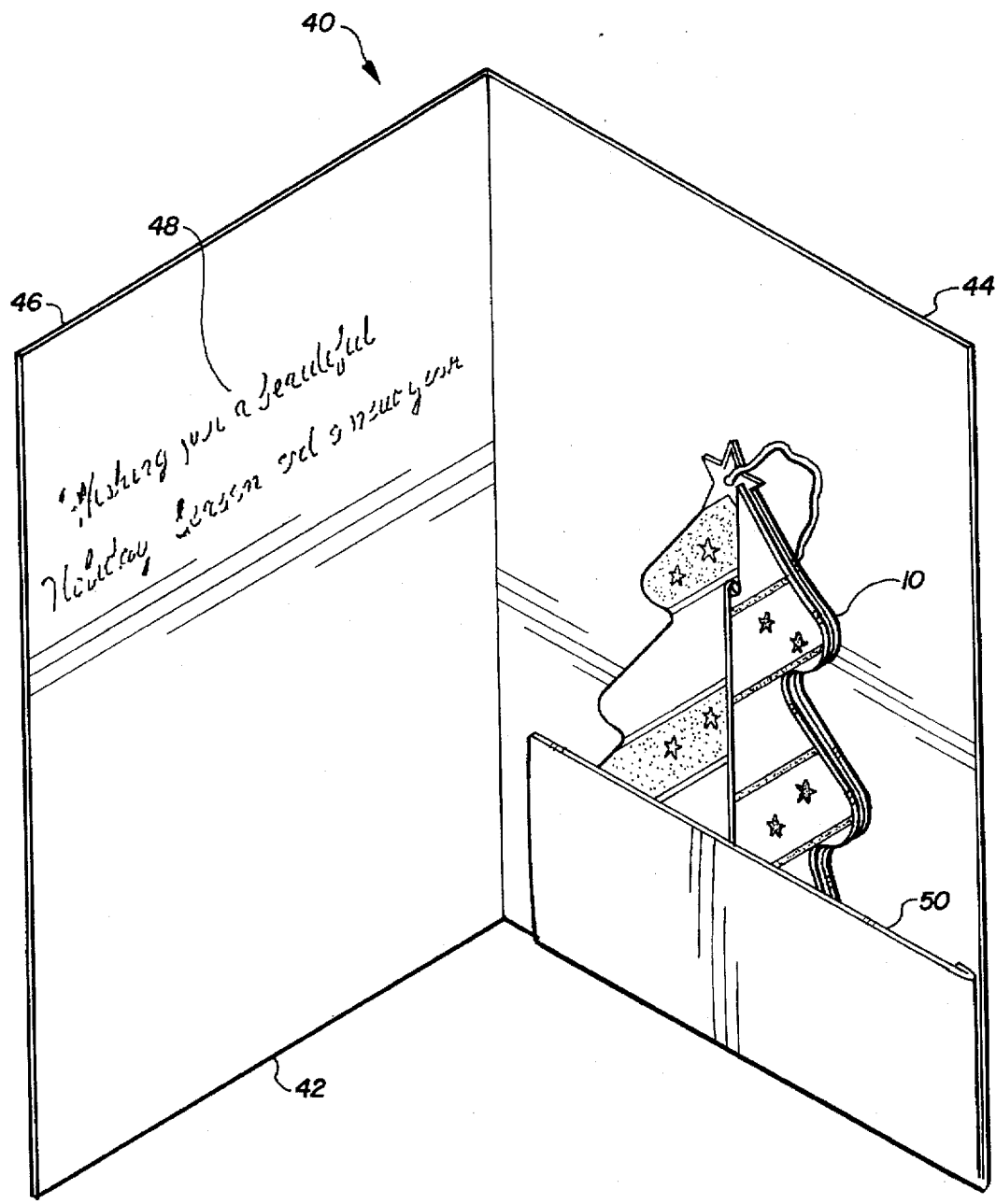
FIG. 1 is a perspective view of an open greeting card according to the invention.

The greeting card 40 according to the present invention is shown in FIG. 1. The card 40 is formed from a planar sheet 42 of cardboard or paper material. The sheet 42 shown is folded in half to form leaves 44 and 46. A greeting, message, or other writing 48 is shown on the inside of sheet 42. Similar greetings, or other indicia may be placed on the front of the card, on the side of leaf 46 opposite the writing 48. Also included in the card is a pocket 50 containing an ornament 10. This arrangement provides a card 40 with all the advantages of traditional greeting card plus the addition of a decorative ornament 10. The sender of this card provides the recipient with an ornament for display, thus providing for the long term remembrance of the sender. The ornament is detached from the card and requires minimal assembly to encourage the recipient to display the ornament.

Figure 2:
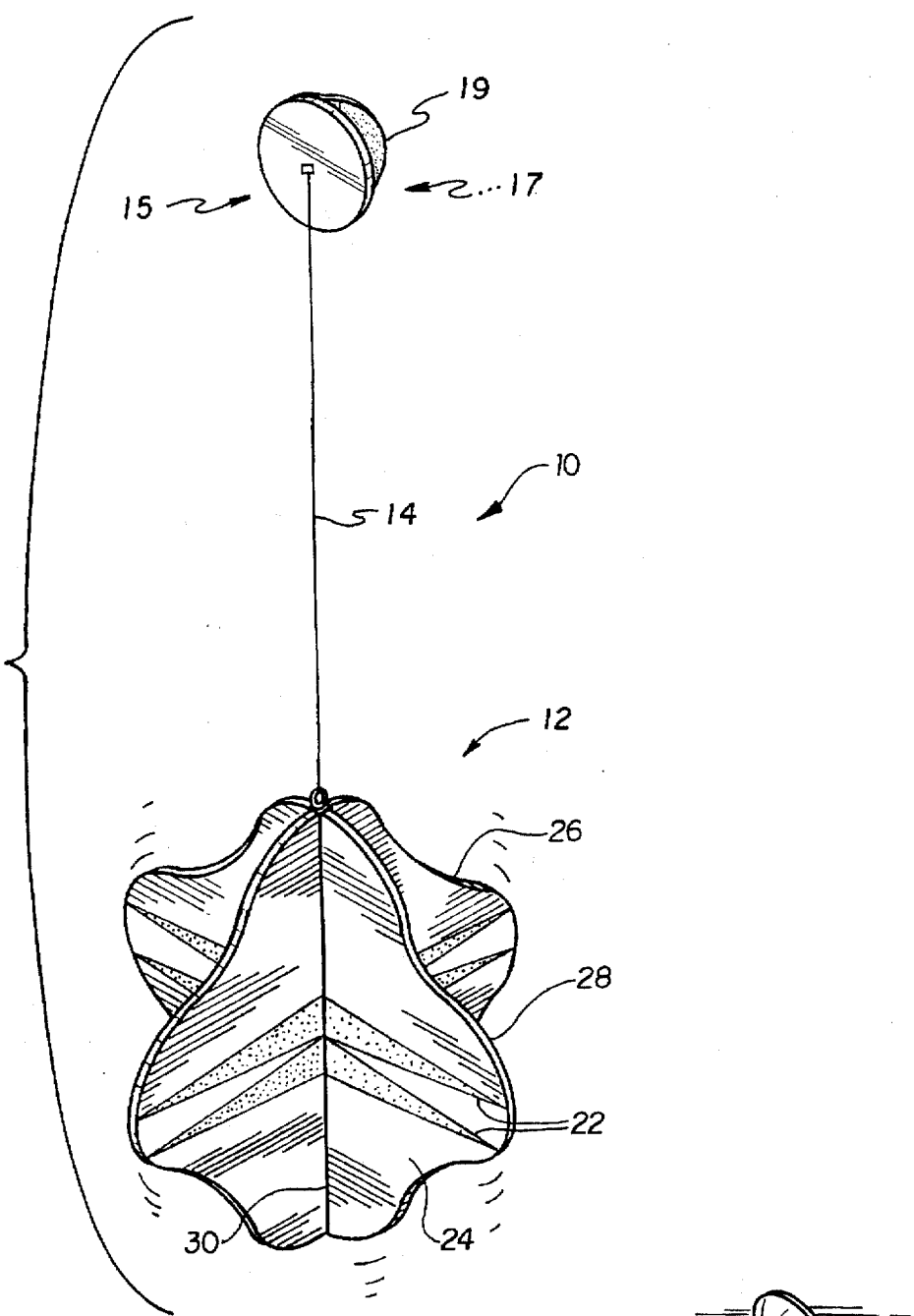
FIG. 2 is a perspective view of an ornament included in the greeting card FIG. 1.

The ornament 10 is shown in more detail in FIG. 2. The novel pendant ornament 10 has an ornamental body 12 and a tether 14. Tether 14 is elastic, so that body 12 oscillates vertically, or bobs up and down, in response to forces inducing movement of body 12. Tether 14 terminates at a sticky pad 15, which secures ornament 10 to a smooth environmental surface. Of course, sticky pad 15 may be omitted, so that ornament 10 can be tied or otherwise attached to any convenient environmental element.

Figure 3:
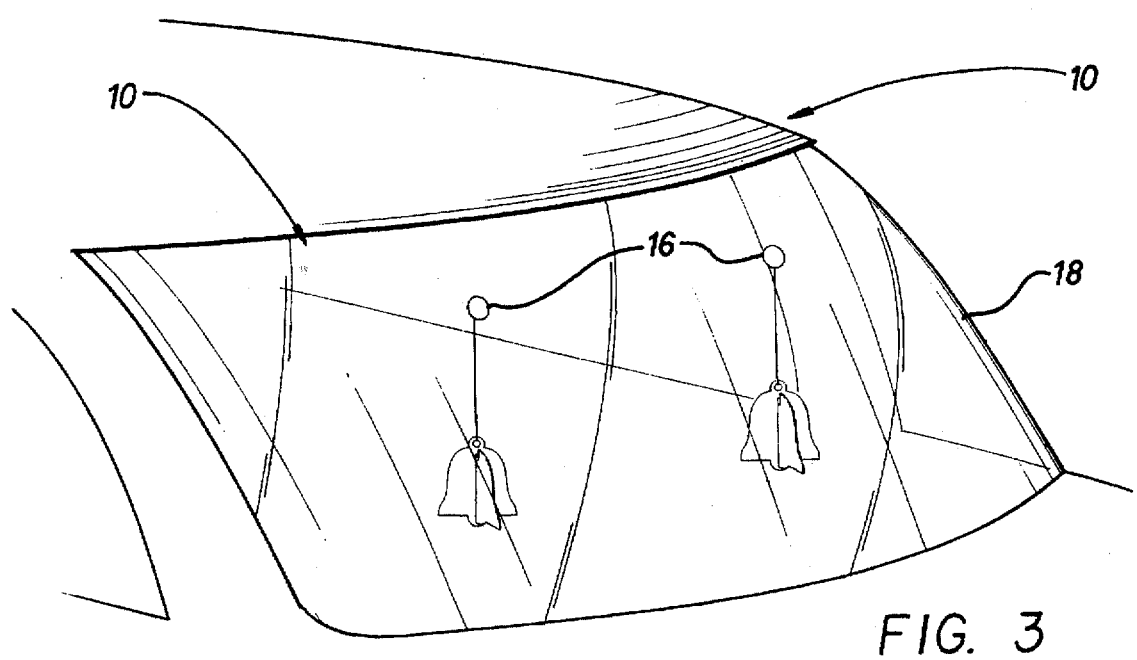
FIG. 3 is a perspective, environmental view of the ornament after removal from the greeting card, drawn to reduced scale.

FIG. 3 illustrates a preferred use of the invention, wherein ornament 10 is fastened to the rear window 18 of a motor vehicle (not shown in its entirety). Suction cup 16 adheres well to smooth surfaces such as glass, and is also readily removed therefrom.

Again referring to FIG. 2, body panels 26 and 28 of body 12 have external ornamentation in the form of indicia, such as geometric forms 22, or the like, which is reflective and preferably of a bright color contrasting with the field 24.

In a preferred embodiment, body panels 26 and 28 are impregnated with a volatile, scented substance, so as to impart an aroma to the immediate environment. A pine aroma is preferred, since this aroma would thematically link the ornament to the theme of the celebration of Christmas. This technology is well known, and will not be further discussed herein.

Figure 4:
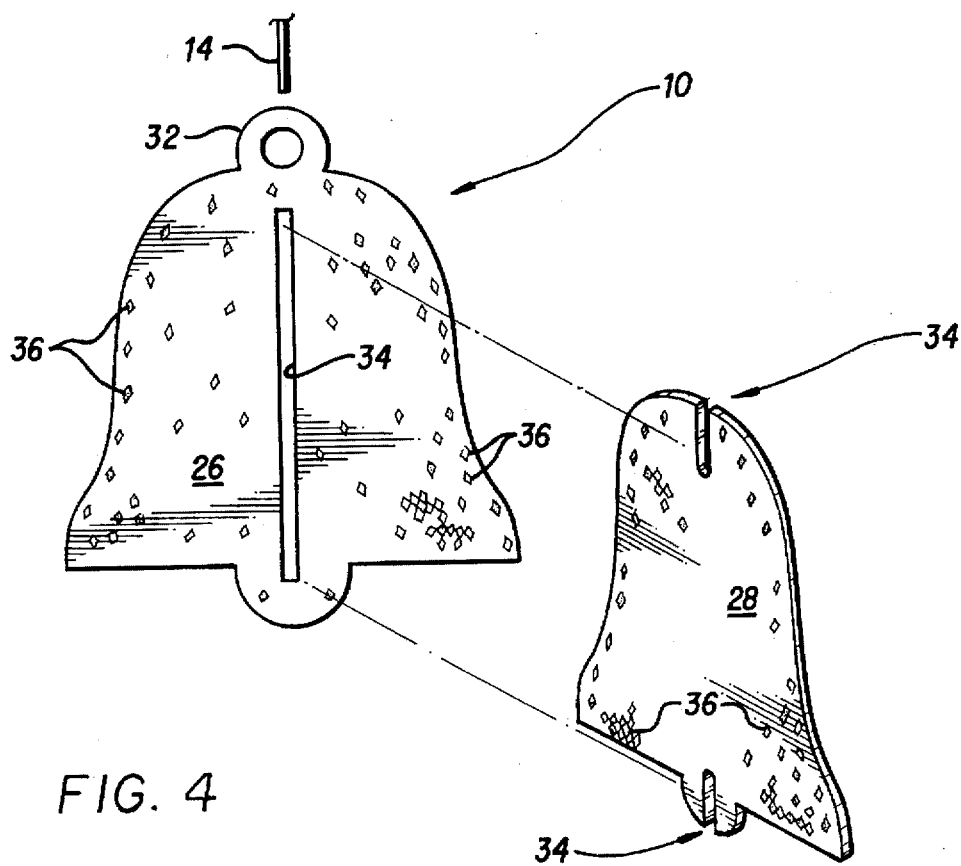
FIG. 4 is a front elevational, exploded view of the ornament, with one member partially rotated.

Turning now to FIG. 4, an advantageous construction of ornament 10 will be discussed. Body 12 is formed from body panels 26 and 28. Body panels 26 and 28 are arranged to intersect at a common vertical joint 30, (see FIG. 2) which is collinear with tether 14 when ornament 10 is at rest. Panel 26 is precut to a desired decorative configuration including interior slot 34 oriented along the vertical centerline of panel 26 and an eye 32 above slot 34. Tether 14 is tied to eye 32. Panel 28 is precut to a similar decorative outline configuration as panel 26 and includes a notch 37 extending downward along the vertical centerline of panel 28 from the top edge and a notch 35 extending upwards along the vertical centerline of panel 28 from the bottom edge. Notches 37 and 35 of panel 28 interfit with the slot 34 of panel 26 to form joint 30. Joint 30 allows panels 26 and 28 to be arranged mutually perpendicular for display, as shown in FIG. 2, or mutually parallel for flat storage within pocket 50, as shown in FIG. 1.

The arrangement of intersecting sheets allows the sheets to act as sails, and causes ornament 10 to rotate and to swing on tether 14 in response to even light air currents. Also, this construction minimizes mass and weight, and lends itself to inexpensive die forming of each sheet. Furthermore, sheet material can be inexpensively fabricated to include a reflective, glittering surface, as will now be discussed.

Figure 5:
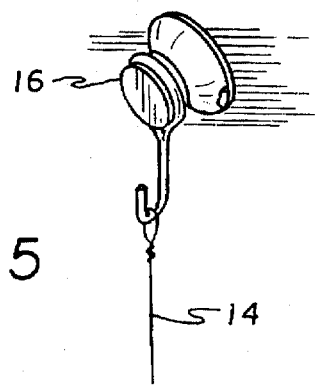
FIG. 5 is a perspective detail view of a second embodiment of the invention, showing a suction cup for adhering the novel ornament to an environmental surface.

For reasons of economy of cost, and to enable flat packaging, it is preferred to adhere ornament 10 by a sticky pad 15. Sticky pad 15 comprises a generally planar material providing a surface for coating with adhesive 17, and enabling penetration by tether 14. Penetration by tether 14 connects sticky pad 15 to tether 14. Obviously, this attachment may be accomplished in other ways to the same effect. Preferably, the planar material is flexible, so that sticky pad 15 can conform to a curved surface. This is desirable since many vehicle rear windows are curved. A release liner 19 is preferably provided to preserve the adhesive from contamination by environmental dust and dirt, prior to use. However, as illustrated in FIG. 5, a suction cup 16 may be substituted for sticky pad 15.

Panels 26 and 28 have glittering surfaces, as provided by reflective facets 36, small particles of reflective material, or by any other suitable material. For the purposes of this invention, glittering is taken to signify that light rays are both reflected and scattered, so that even slight motion will reflect and discontinue impinging light with great frequency. By contrast, a planar mirror finish would reflect light, but would not scatter it. Thus, while a mirror finish may be employed in the present invention, it would require treatment to achieve glittering. For example it could be divided into facets oriented at slightly different planes. This would cause the mirror to reflect small points of light individually and not simultaneously, thereby achieving the effect of glittering. When a glittering surface is moved in the presence of light, the individual flashes produced as light is reflected from each facet or glittering element produces a pleasing and intriguing twinkling effect.

Thus, an inexpensive, colored, reflective ornament is produced which exhibits the motions of bobbing, swinging, and rotation in response to ordinary motions of a motor vehicle and air currents within. A desired twinkling visual effect is achieved with minimal structure, and with no effort on the part of an observer or user of the device.

It is to be understood that the present invention is not limited to the sole embodiment described above, but encompasses any and all embodiments within the scope of the following claims.

I claim:

1. A combination of a greeting card and an ornament comprising:
    a planar sheet of material folded to form a greeting card having a pocket, said pocket containing an ornament, said ornament including,
        a first panel having an interior slot formed along a vertical centerline of said first panel and an eye located above the slot proximate a top of said first panel,
        a second panel having a first notch extending from a top edge downwards along a vertical centerline of said second panel and a second notch extending from a bottom edge upwards along the vertical centerline of said second panel, said second panel inserted into the interior slot of said first panel to form a body.

2. The combination according to claim 1 further comprising an elastic tether attached to said eye of said first panel.

3. The combination according to claim 2 wherein said elastic tether further comprises attachment means for releasably attaching said tether to an environmental surface.

4. The combination according to claim 3 wherein said attachment means comprises a pad of flexible planar material having a surface coated with an adhesive material, said adhesive material protected by a release liner.

5. The combination according to claim 3 wherein said attachment means comprises a suction cup.

6. The combination according to claim 1 further comprising a volatile, scented substance impregnated within said body.

7. The combination according to claim 1 wherein said body has glittering surfaces.

8. The combination according to claim 1 wherein said planar sheet is folded in half to form a first leaf and a second leaf.

9. The combination according to claim 1 wherein said planar sheet includes writing on a surface thereof.

10. A combination of a greeting card and an ornament comprising:
    a planar sheet of material folded to form a greeting card having a pocket, said pocket containing an ornament;
    said ornament including,
        a first panel of a decorative outline having, an interior slot formed along a vertical centerline of said first panel, and an eye formed proximate the top of said first panel above the slot,
        a second panel of a similar decorative outline to said first panel, said second panel having, a first notch extending from a top edge downward along a vertical centerline of said second panel, and a second notch extending from a bottom edge upwards along the vertical centerline of said second panel, said second panel inserted into the interior slot of said first panel to form a body,
    said body including external ornamentation having reflective, glittering surfaces;
    an elastic tether attached to said eye in said first panel;
    a pad attached to said tether for supporting said body from a smooth environmental surface, said pad including a surface coated with an adhesive material; and
    a volatile, scented substance impregnated within said body.

* * * * *